United States Patent [19]

Carobolante et al.

[11] Patent Number: 5,350,984
[45] Date of Patent: Sep. 27, 1994

[54] METHOD AND APPARATUS FOR STARTING A BRUSHLESS DC MOTOR

[75] Inventors: Francesco Carobolante, Portola Valley, Calif.; Ermanno Pace, Phoenix, Ariz.

[73] Assignee: SGS-Thomson Microelectronics, Inc., Carrollton, Tex.

[21] Appl. No.: 30,846

[22] Filed: Mar. 12, 1993

[51] Int. Cl.⁵ .......................................... H02R 23/00
[52] U.S. Cl. ................................. 318/254; 318/439; 318/139
[58] Field of Search ..................... 318/254, 139, 439

[56] References Cited

U.S. PATENT DOCUMENTS

| | | | |
|---|---|---|---|
| 4,879,498 | 11/1989 | Shinohara et al. | 318/254 |
| 4,928,043 | 5/1990 | Plunkett | 318/254 |
| 5,223,771 | 6/1993 | Chari | 318/254 |
| 5,231,338 | 7/1993 | Bulgarelli et al. | 318/254 |

*Primary Examiner*—William M. Shoop, Jr.
*Assistant Examiner*—Karen Masih
*Attorney, Agent, or Firm*—Richard A. Bachand; Lisa K. Jorgenson; Richard K. Robinson

[57] ABSTRACT

A method for aligning a rotor of a brushless and sensorless DC motor, the motor having a stator with at least two coils, sets of the coils being selectively energizable by a power source connected to the motor, includes steps of energizing a first set of at least one coil of the at least two coils; generating a signal indicating whether the rotor has been rotated at a rotary speed greater than a predetermined rotary speed while the first set was energized; and when the signal indicates that the rotor has not been rotated at a rotary speed greater than the predetermined rotary speed, switching the connection between the power source and the motor and energizing a second set of at least one coil of the at least two coils. A device for controlling an alignment of a rotor of a brushless and sensorless DC motor includes a circuit for energizing a first set of at least one coil; a circuit for generating a signal indicating whether the rotor has been rotated due the first set having been energized; and a circuit for energizing a second set of at least one coil when the signal indicates the rotor has not been rotated.

20 Claims, 2 Drawing Sheets

METHOD AND APPARATUS FOR STARTING A BRUSHLESS DC MOTOR

BACKGROUND OF THE INVENTION

1. Field of the Invention

The present invention relates generally to brushless and sensorless DC motors, and in particular, to a method and apparatus for aligning a rotor of the motor with respect to a stator of the motor before accelerating the motor to an operating rotation speed.

2. Description of Related Art

Brushless and sensorless DC motors are often started using an "align and go" technique. During the align step, the rotor of the motor is rotated to a known position relative to the stator. Thereafter, the rotor is accelerated to a predetermined rotation speed and controlled to rotate at a desired rotation speed.

Conventional motors of this type contain a stator having three drive coils arranged in a "Y" configuration, each coil being arranged to be phase separated from each other by 120° as shown in FIG. 1. To align the rotor with respect to the stator, a current is passed through two of the coils (e.g., A and B) while the remaining terminal (e.g., C) remains open circuited with respect to the center tap (e.g., T). Under the influence of the current applied to the two coils, the rotor rotates to a rotary position where the magnetic flux generated by the current in the two energized coils is maximized. The exact rotary motion of the rotor depends on the drive current and the rotor's inertia and damping characteristics; however, after a predetermined worst case settling time interval, the rotor is aligned based on the selected and energized coils.

This technique is sufficient when applied to an ideal frictionless motor. However, real motors are characterized by friction: a dynamic friction which becomes part of the damping characteristics and a static friction which is ordinarily greater than the dynamic friction and which may prevent the rotor from moving at all when the torque applied is small. Typically, the torque applied to the rotor of the motor depends on the rotor angle with respect to the energized coils. If the torque is insufficient to overcome the static friction, the rotor does not properly align.

SUMMARY OF THE INVENTION

It is an object of the present invention to overcome the limitations in the prior art. In particular, it is an object of the present invention to align a rotor of a motor with improved accuracy and speed.

These and other objects are achieved with a method for aligning a rotor of a brushless and sensorless DC motor including the steps of energizing a first set of coils, generating a signal indicating whether the rotor has been rotated at a sufficient rotary speed, and when the signal indicates that the rotor has not been rotated at a sufficient rotary speed, energizing a second set of coils. The motor has a stator with at least two coils, sets of the coils being selectively energizable by a power source connected to the motor. The energizing step energizes the first set of coils of the at least two coils. A signal generation step generates the signal which indicates whether the rotor has been rotated at a sufficient rotary speed while the first set of coils was energized. When the signal indicates that the rotor has not been rotated with a sufficient rotary speed, the method includes a step of commutating the connection between the power source and the motor before energizing the second set of coils of the at least two coils. Thus, the second set of coils is energized only when the signal indicates that the rotor has not been rotated at a sufficient rotary speed.

These and other objects are achieved with a device for controlling an alignment of a rotor of a brushless and sensorless DC motor, where the motor has a stator with at least two coils, sets of the coils being selectively energizable by a power source connected to the motor. The device for controlling an alignment of the rotor includes a circuit for energizing a first set of coils of the at least two coils; a circuit for generating a signal indicting whether the rotor has been rotated due to the first set of coils having been energized; and a circuit for energizing a second coil of the at least two coils when the signal indicates that the rotor has not been rotated.

BRIEF DESCRIPTION OF THE DRAWINGS

The invention will be described in detail in the following description of preferred embodiments with reference to the following figures wherein.

DESCRIPTION OF PREFERRED EMBODIMENTS

To overcome misalignment due to the static friction or other causes, a double align start-up technique may be used which employs a two stage alignment process. The first stage aligns the rotor to a first rotary position by applying a drive current for a predetermined time to a first set of at least one coil. The second stage, executed after the first stage, aligns the rotor to a second rotary position, typically displaced 120° from the first rotary position, by applying a drive current for the predetermined settling time to a second set of at least one coil.

The first stage attempts to rotate the rotor to bring it into alignment. However, it is not necessary that for the rotor to become aligned, so long as the rotor is moved in the first stage.

The second stage ensures that the rotor is aligned to the second rotary position since the first and second rotary positions are separated by a sufficient angle that the second stage torque will overcome the static friction when the rotor is aligned close to the first rotary position. Thus, the rotor is precisely aligned in a period of time equal to the sum of the two stage's energizing times. However it is beneficial to provide an even faster alignment.

Figure 1:
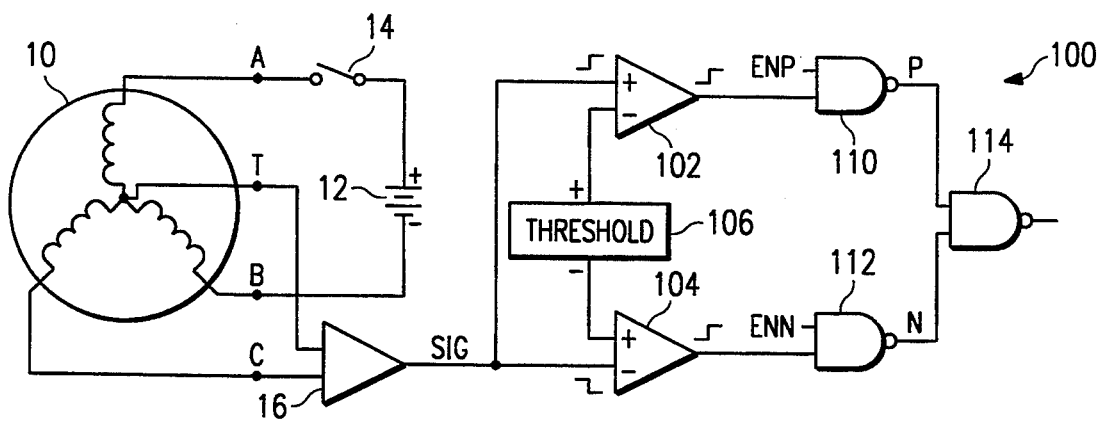
FIG. 1 is a schematic diagram of a first embodiment of the present invention.

In FIG. 1, stator 10 includes two coils arranged in a center tapped "Y" configuration providing leads for coils A, B and C and a center tap T. At a first energization time, power source 12 is selectively applied to a first set of at least one coil (here two coils A and B) in the stator 10 through a commutation selection means or switch 14. Simultaneously, differential amplifier 16 senses a back EMF generated between center tap T and the open circuit end of coil C to produce signal SIG. Signal SIG varies sinusoidally (approximately) as a function of rotation angle and rotational speed (see 202 in FIG. 2).

Figure 4:
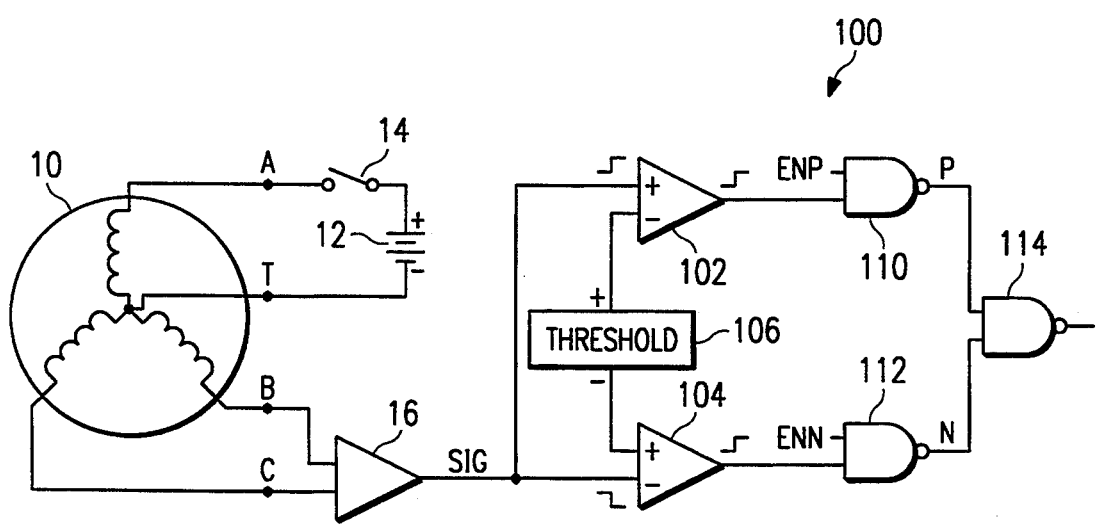
FIG. 4 is a schematic diagram of a second embodiment of the present invention.

FIG. 4 shows a second preferred embodiment of a 3-coil stator. In FIG. 4, stator 10 has three coils A, B and C in a center tapped Y configuration. The first set of at least one coil comprises one of the coils, for example coil A, connected through the center tap T to the power source 12. The other two coils, for example coils B and C, are each connected to one of the inputs of the differential amplifier 16 to generate the SIG signal. The second set of at least one coil can then comprise switching one of coils B and C for coil A, and vice versa. Alternately, both of coils B and C could be switched with both coil A and the center tap T.

It is of course understood that the first preferred embodiment shown in Fig. 1 and the second preferred embodiment shown in FIG. 4 can be adapted for stators having four or more coils as well. It is also understood that the power source 12 can be connected to the sets of coils regardless of polarity. That is, in FIG. 1, the polarity of the power source 12 could be reversed without affecting the operation of the present invention. Likewise, either coil A or B in FIG. 1, or the tap T in FIG. 4 could alternately be connected, along with the corresponding terminal of the power source, to ground.

Figure 2:
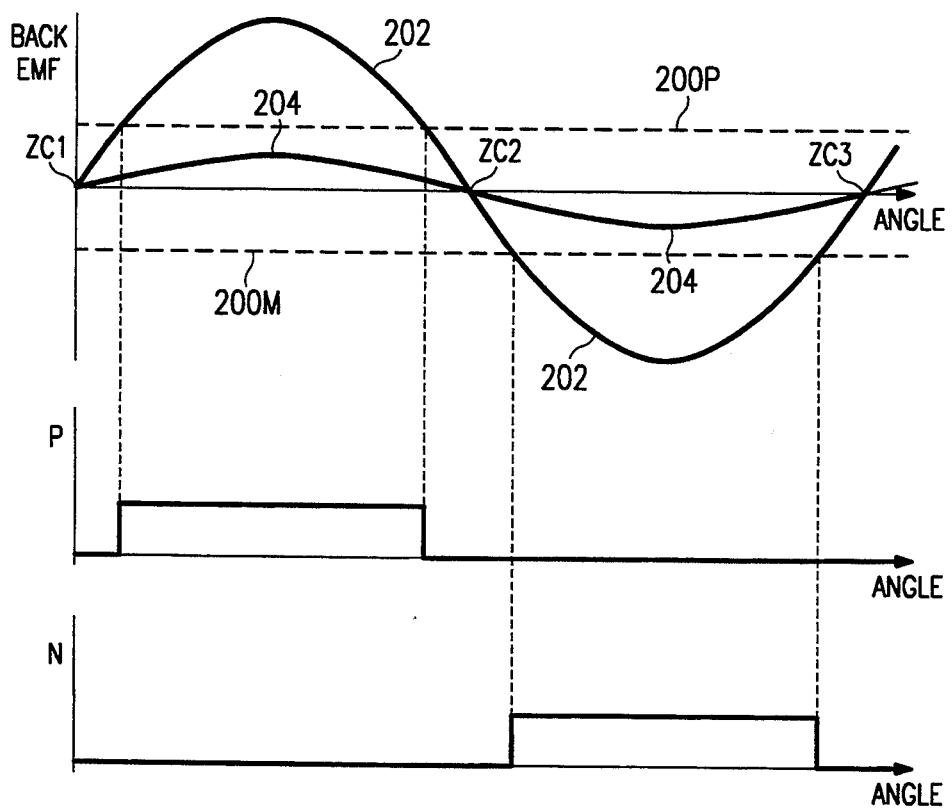
FIG. 2 is a timing diagram showing the operation of the apparatus of FIG. 1.

In FIG. 2, the back EMF is shown as a function of the rotary position angle. Curve 202 indicates the back EMF generated when the rotor rotates at a fast speed and curve 204 indicates the back EMF as a function of rotor angle when the rotor rotates at a rotation speed slower than the rotation speed corresponding to curve 202. When there is sufficient rotor rotary speed to ensure good alignment, the rotor will move at a rotation rate corresponding to curve 202. When there is not sufficient rotor torque to ensure good alignment the rotor will either fail to rotate or will rotate at a rotational rate corresponding to curve 204. In order to provide for system electrical noise margins and to distinguish between a sufficient and an insufficient rotation rate, thresholds 200P and 200M, as indicated in FIG. 2, are employed. It should be understood a motor may be designed to respond to small torques so that thresholds 200P and 200M are primarily defined by electrical noise considerations.

In FIG. 1, signal SIG is applied to a plus input of comparator 102 and a minus input of comparator 104. A plus threshold of reference 106 is applied to the minus input of comparator 102 and a minus threshold of reference 106 is applied to the plus input of comparator 104. When a positive going signal SIG becomes greater than the plus threshold of reference 106, comparator 102 produces a logic high level on signal P. When a negative going signal SIG becomes less than the minus threshold of reference 106, comparator 104 produces a logic high level on signal N. It will be understood that other circuits may be designed to provide signal testing against thresholds 200P and 200M.

In FIG. 2, curve 202 begins at zero crossing ZC1 and continues to a second zero crossing ZC2 and from there to a third zero crossing ZC3. When curve 202 (representing signal SIG) increases from zero crossing ZC1, it crosses threshold 200P at an angular position slightly after zero crossing ZC1, depending on the value of plus threshold 200P. When curve 202 crosses plus threshold 200P, signal P changes from a logic low state to a logic high state, where it remains until curve 202 recrosses plus threshold 200P at an angular position just prior to zero crossing ZC2, producing the signal P indicated in FIG. 2. In a similar manner, signal N changes from a logic low state to a logic high state when curve 202 becomes more negative than minus threshold 200M and remains in a logic high state until curve 202 recrosses minus threshold 200M at an angular position just prior to zero crossing ZC3.

In FIG. 1, signal P and enabling signal ENP are applied to NAND gate 110. Similarly, signal N and enabling signal ENN are applied to NAND gate 112. The output of NAND gates 110 and 112 are applied to the input of NAND gate 114.

In operation, when signals ENP and ENN are in a logic high state, the output of NAND gate 114 will switch to a logic high state when either signal P or signal N become logic high. Thus, NAND gate 114 produces a logic high output when signal SIG is greater than the plus threshold or when signal SIG is more negative than a minus threshold. This occurrence happens when the rotor of the motor rotates with sufficient rotary speed to generate a back EMF signal with sufficient magnitude to exceed the threshold of reference 106.

In FIG. 2, when the rotor rotates at a slower rotary speed producing a back EMF signal corresponding to curve 204, signals P and N remain in a logic low state so that the output from NAND gate 114 remains in a logic low state, indicating that the rotor is moving at a rotary speed below a given speed threshold or not moving at all. Such a slow rotary speed might generate an unreliable alignment condition.

Figure 3:
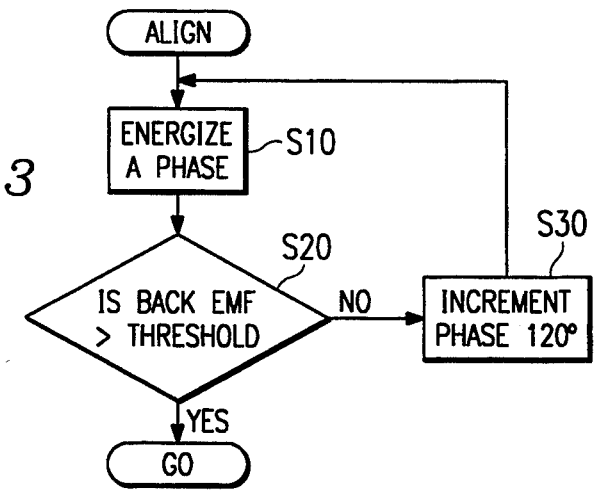
FIG. 3 is a flowchart showing the steps of the method of the present invention.

FIG. 3 shows the steps of the method of the present invention. The align process includes a step S10 where a first set of at least one coil is energized. For example, in FIG. 1, switch 14 is closed to pass current into stator 10 through coil A and return current out of stator 10 through coil B (or vice versa).

This set of at least one coil remains energized for a predetermined time sufficient to cause the rotor to rotate. A back EMF is sensed to produce a signal indicating whether the rotor has been rotated at a speed greater than a predetermined rotary speed threshold by a circuit, for example the circuit shown in FIG. 1. In step S20, the signal is generated to indicate that the rotor has been rotated at a sufficient rotary speed to ensure proper alignment between rotor and stator, in which case the alignment process proceeds to the GO phase.

If, after a predetermined settling period, the signal indicating a sufficient rotation rate of the rotor relative to the stator has not been generated, a second set of at least one coil of the motor, rotated by, for example, 120° from the first set, is selected in step S30 and the second set of at least one coil is energized at step S10. Thus, the step S20 of generating the signal (at a time within a predetermined settling time interval) is operated only once if the threshold crossings are detected on the initial energization.

If, however, no threshold crossing is detected on the initial energization, the second set of at least one coil is energized to ensure that a sufficient torque will be applied to the rotor so that the back EMF signal will cross the thresholds on the second energization step. In a limited number of cases where energizing the first and the second sets of at least one coil does not produce the signal indicating proper alignment, the operation may be repeated with third, etc. sets of coils until movement of the rotor is deteced, to accomplish the alignment. In this way, the alignment requires only one predetermined settling time in most alignment trials, thus, on the average, saving on start-up time.

Having described the preferred embodiments of a novel method and apparatus for starting a brushless DC motor employing the "align and go" technique (which are intended to be illustrative and not limiting) it is noted that modification and variations can be made by those skilled in the art in light of the above teachings, for example, stator 10 may be organized as a "delta" configured three phase (coil) motor, or stator 10 may be configured as a polyphase (coil) motor. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the following claims.

What is claimed is:

1. A method for aligning a rotor of a brushless and sensorless DC motor, the motor having a stator with at least two coils, the coils being selectively energizable by a power source connected to the motor, the method comprising steps of:
   energizing a first coil of the at least two coils;
   generating a signal indicating whether the rotor has been rotated at a rotary speed greater than a predetermined rotary speed while the first coil was energized; and
   when the signal indicates that the rotor has not been rotated at the rotary speed greater than the predetermined rotary speed, commutating the connection between the power source and the motor and energizing a second coil of the at least two coils.

2. The method of claim 1, wherein:
   the step of energizing the first coil leaves the second coil unenergized; and
   the step of energizing the second coil leaves the first coil unenergized.

3. The method of claim 1, wherein the step of generating a signal includes sensing a back EMF signal from at least one unenergized coil of the at least two coils.

4. The method of claim 3, wherein the step of generating a signal further includes detecting a condition when the back EMF signal is one of greater than a plus threshold and less than a minus threshold.

5. The method of claim 4, wherein the step of generating a signal further includes producing the signal when the step of detecting detects the condition at any time within a predetermined settling time.

6. The method of claim 1, wherein:
   the step of energizing the first coil energizes the first coil for a first predetermined time; and
   the step of energizing the second coil energizes the second coil for a second predetermined time.

7. The method of claim 1, wherein the step of energizing the first coil energizes the first coil for a first predetermined time, the method aligning the rotor in a predetermined settling time when the signal indicates that the rotor has been rotated at the rotary speed greater than the predetermined rotary speed while the first coil was energized.

8. The method of claim 7, wherein the method energizes the second coil for a second predetermined time when the signal indicates that the rotor has not been rotated at the rotary speed greater than the predetermined rotary speed while the first coil was energized, and generating a second signal indicating whether the rotor has been rotated at a rotary speed greater than a predetermined rotary speed while the second coil was energized.

9. The method of claim 1, wherein the step of generating a signal includes connecting the second coil to a sense circuit to generate the signal while the first coil is being energized.

10. A method for controlling an alignment of a rotor of a brushless and sensorless DC motor, the motor having a stator with at least two coils, subsets of the coils being selectively energizable by a power source connected to the motor, the method comprising the steps of:
    energizing a first subset of the at least two coils;
    generating a signal indicating whether the rotor has been rotated due to the first subset having been energized; and
    when the signal indicates that the rotor has not been rotated, energizing a second subset of the at least two coils.

11. A device for aligning a rotor of a brushless and sensorless DC motor, the motor having a stator with at least two coils, sets of at least one coil being selectively energizable by a power source connected to the motor, the device comprising:
    a first circuit for energizing a first set of at least one coil of the at least two coils;
    a comparator circuit for generating a signal indicating whether the rotor has been rotated at a rotary speed greater than a predetermined rotary speed while the first set was energized; and
    energizing means for commutating the connection between the power source and the motor and energizing a second set of at least one coil of the at least two coils when the signal indicates that the rotor has not been rotated at the rotary speed greater than the predetermined rotary speed.

12. The device of claim 11, wherein:
    the first circuit energizes the first set while leaving the second set unenergized; and
    the energizing means energizes the second set while leaving the first set unenergized.

13. The device of claim 11, wherein the comparator circuit includes a circuit for sensing a back EMF signal from at least one unenergized coil of the at least two coils.

14. The device of claim 13, wherein the comparator circuit further includes a circuit for detecting a condition when the back EMF signal is one of greater than a plus threshold and less than a minus threshold.

15. The device of claim 14, wherein the comparator circuit further includes a circuit for producing the signal when the circuit for detecting detects the condition at any time within a predetermined energizing time.

16. The device of claim 11, wherein:
    the first circuit energizes the first set for a predetermined settling time; and
    the energizing means energizes the second set for a second predetermined time.

17. The device of claim 11, wherein the first circuit energizes the first set for a predetermined settling time, the device controlling the rotor to be aligned in a predetermined settling time when the signal indicates that the rotor has been rotated at the rotary speed greater than the predetermined rotary speed while the first set was energized.

18. The device of claim 17, wherein the energizing means comprises:

a second circuit for energizing the second set of at least one coil of the at least two coils when the signal indicates that the rotor has not been rotated at the rotary speed greater than the predetermined rotary speed while the first set was energized, and a second comparator circuit for generating a second signal indicating whether the rotor has been rotated at a rotary speed greater than a predetermined rotary speed while the second set was energized.

19. The method of claim 11, wherein the comparator circuit includes a sense circuit selectively connectable to a set of at least one unenergized coil to generate the signal while the first set is energized.

20. A device for controlling an alignment of a rotor of a brushless and sensorless DC motor, the motor having a stator with at least two coils, sets of the coils being selectively energizable by a power source connected to the motor, the device comprising:

first energizing means for energizing a first set of at least one coil of the at least two coils;

generating means for generating a signal indicating whether the rotor has been rotated due to the first set having been energized; and second energizing means for energizing a second set of at least one coil of the at least two coils when the signal indicates that the rotor has not been rotated.

* * * * *